United States Patent [19]
Berg

[11] 3,808,901
[45] May 7, 1974

[54] TRANSMISSION BELT

[76] Inventor: Winfred M. Berg, 89 Grant Ave., East Rockaway, N.Y. 11518

[22] Filed: Aug. 2, 1972

[21] Appl. No.: 277,166

[30] Foreign Application Priority Data
Aug. 17, 1971  Great Britain.................... 38463/71

[52] U.S. Cl.................................. 74/231 C, 74/236
[51] Int. Cl............................ F16g 1/28, F16g 5/10
[58] Field of Search................... 74/236, 231 C, 237

[56] References Cited
UNITED STATES PATENTS

| | | | |
|---|---|---|---|
| 2,874,583 | 2/1959 | Platt | 74/231 C |
| 803,811 | 11/1905 | Cutter | 74/231 C |
| 1,546,704 | 7/1925 | Barker | 74/236 |
| 2,322,967 | 6/1943 | Perry | 74/231 C |
| 2,608,875 | 9/1952 | Ellison et al. | 74/236 |
| 3,720,113 | 3/1973 | Doorne et al. | 74/236 |

FOREIGN PATENTS OR APPLICATIONS

| | | | |
|---|---|---|---|
| 526,179 | 9/1940 | Great Britain | 74/236 |
| 1,160,459 | 3/1958 | France | 74/236 |
| 1,343,123 | 10/1963 | France | 74/231 C |

Primary Examiner—Leonard H. Gerin
Attorney, Agent, or Firm—Edward Halle, Esq.

[57] ABSTRACT

A flexible transmission belt usable with V-belt pulleys comprising at least one plastic covered cable on which a series of V-blocks are positioned. The V-blocks may have a wing-like cross section as well as lateral connecting struts, and the material of the cable cover and the blocks may be integral.

24 Claims, 19 Drawing Figures

PATENTED MAY 7 1974 3,808,901
SHEET 1 OF 2
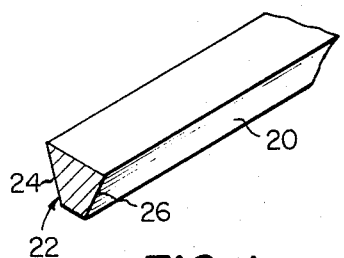
FIG. 1
FIG. 2
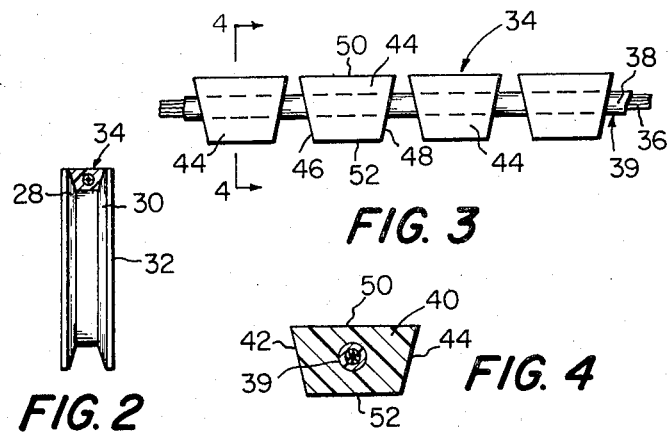
FIG. 3
FIG. 4
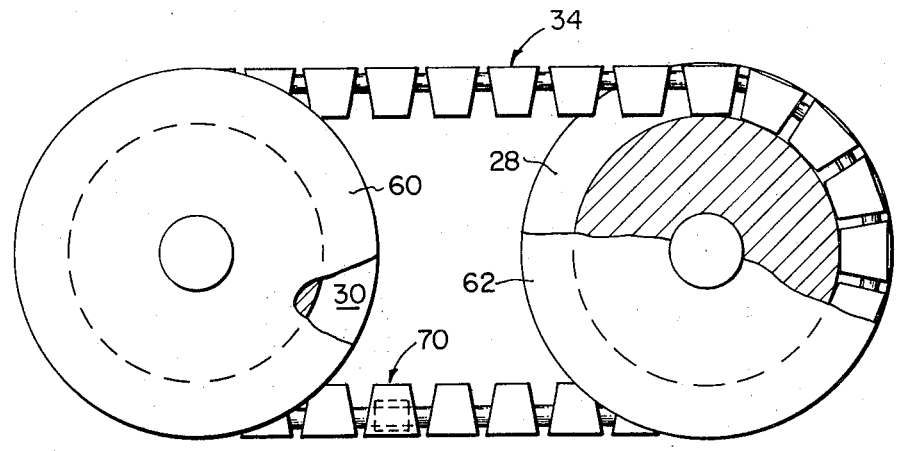
FIG. 5
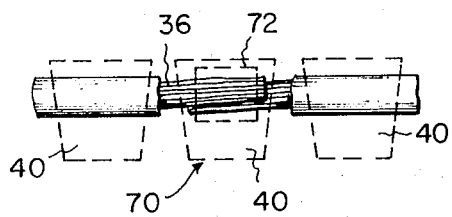
FIG. 6
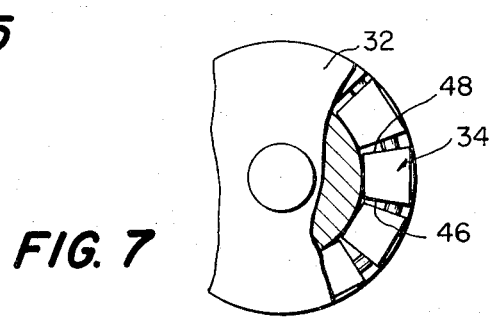
FIG. 7
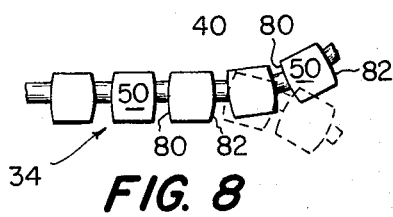
FIG. 8
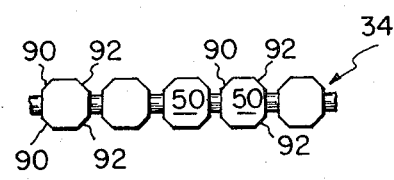
FIG. 9

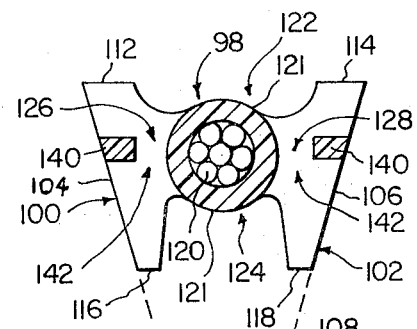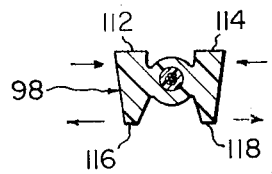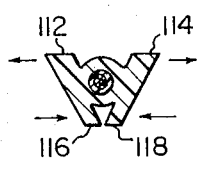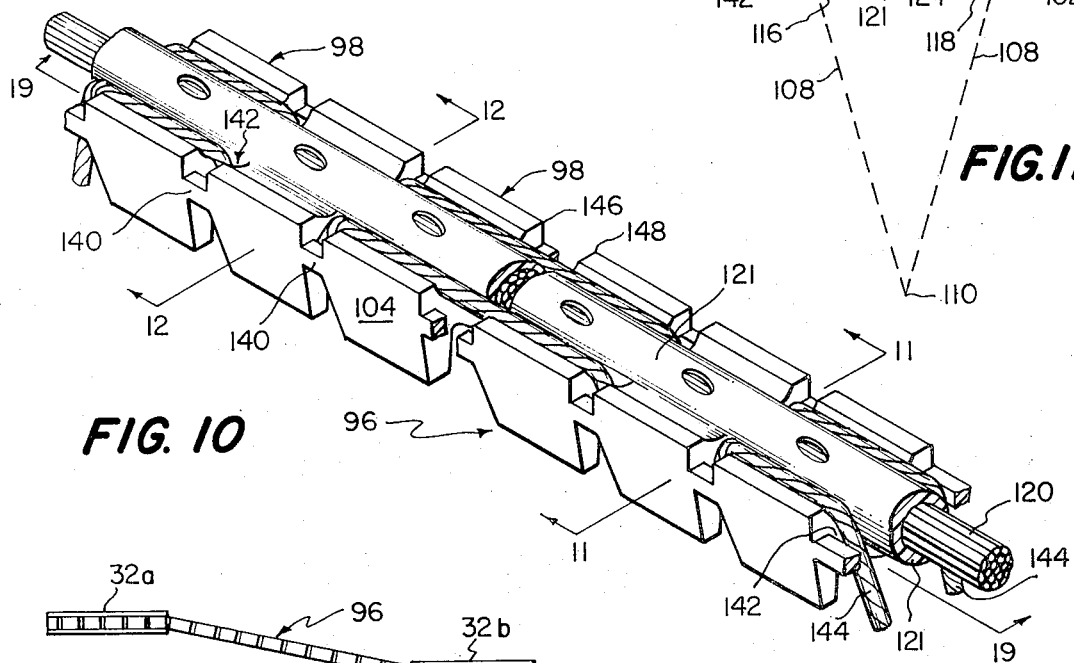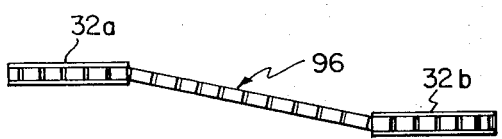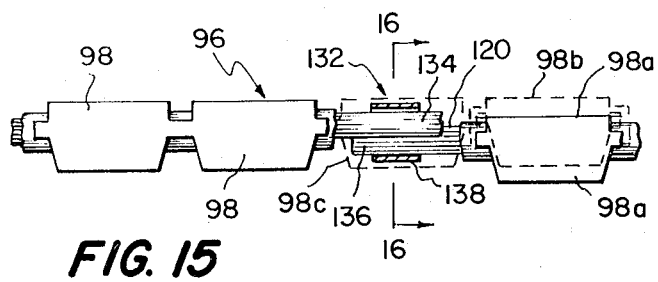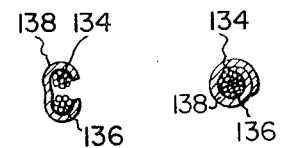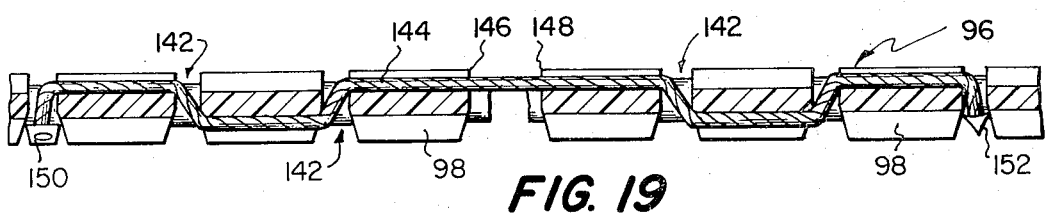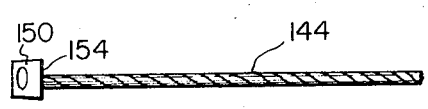

3,808,901

TRANSMISSION BELT

SUMMARY OF THE INVENTION

This invention relates to a V belt ordinarily used as a driving transmission means between a pair of pulleys. The conventional V-belt operates with conventional V-belt pulleys, and a very general use is in connection with timing pulleys on various devices including timing mechanisms for internal combustion engines.

The conventional V-belt pulley 20 is usually made of a flexible material and has a cross section as shown at reference numeral 22 in FIG. 1. The sides 24 and 26 converge in a V shape, and are adapted to fit the inner walls 28 and 30 of the standard pulley 32 shown in FIG. 2 of the drawings. Because of the construction of a conventional V-belt pulley, its application is fairly limited to a transmission connection between two pulleys which are positioned in substantially the same plane perpendicular to their axes. Another disadvantage of the conventional V-belt is that a pulley must be moved off its usual axis in order to install the belt.

It is, therefore, an object of this invention to provide a V-belt which can be installed without disturbing the machinery including the pulleys on which it is to be used, and to provide such a belt which has greater flexibility than the conventional belt, great strength and durability, and one which can be flexed around small and large pulleys with equal facility, and an improved V-Belt in which the pulleys need not be substantially within the same plane for proper transmission of power from one pulley to another.

BRIEF DESCRIPTION OF THE SEVERAL VIEWS OF THE DRAWINGS

FIG. 1 is a perspective, partly in section, showing the V-belt of the prior art;

FIG. 2 is an end elevation of a pulley wheel showing a portion of a belt of the invention in section;

FIG. 3 is a side elevation with parts cut away;

FIG. 4 is a section along the lines 4—4 of FIG. 3;

FIG. 5 is a side elevation with parts in phantom;

FIG. 6 is a side elevation with parts cut away and parts in phantom;

FIG. 7 is a side elevation with parts cut away;

FIG. 8 is a top plan view with parts dotted in to show flexibility;

FIG. 9 is a top plan view with parts cut away;

FIG. 10 is a perspective view of another form of the invention;

FIG. 11 is a section along the lines 11—11 in FIG. 10;

FIG. 12 is a section along the lines 12—12 in FIG. 10 with the sides of the block flexed inwardly at the bottom and outwardly at the top;

FIG. 13 is a section similar to FIG. 12 except that the sides of the block are flexed outwardly at the bottom and inwardly at the top;

FIG. 14 is a top plan view of the belt shown in FIG. 10 connecting two pulleys;

FIG. 15 is a side elevational view of the belt shown in FIG. 10 with parts cut away showing a splicing area;

FIG. 16 is a sectional view along the lines 16—16 in FIG. 15;

FIG. 17 is a sectional view similar to FIG. 16 with the bushing 138 crimped;

FIG. 18 is a plan view; and

FIG. 19 is a sectional view along the lines 19—19 in FIG. 10.

DETAILED DESCRIPTION OF THE INVENTION

The cable V belt 34 of the invention comprises a central cable 36 which is preferably made of twisted steel wire. However, any other suitable cable construction may be adapted to use in the invention. The cable 36 is provided with a coating or jacket 38 which may be molded over the cable from a plastic material such as a soft polyurethane. In this form of the invention, the plastic jacket 38 is extruded over the cable. A plurality of V shaped blocks are molded over the jacket 38 of cable 36. Each block 40 has a pair of converging V shaped sides 42 and 44 as well as a pair of preferably V shaped ends 46 and 48. There is a top portion 50 and a bottom portion 52 to complete the structure.

Throughout this description the blocks of the invention are referred to as "the V-blocks". It is to be understood that this refers to the cross sectional form of the blocks and the term "V-shaped" is used in its usual sense to define that the sides of the blocks, similar to the sides of belt 20, converge in a V shape to be accommodated within the converging walls 28 and 30 of a pulley 32.

The V shape of the prior art belt 20, as well as the V shape of blocks 40 and 98 of this invention, in the preferred forms, contemplate that the lower portion of the V (represented by the dotted lines in FIG. 11) is eliminated. Thus a V-shaped block of the invention can be defined as having opposed sides in which each side comprises a surface portion normally in a plane which, together with the plane of the opposite sides, forms, in cross section, an outline corresponding to at least a portion of the lines of a V. In the case of this invention the portion of the lines of the V would be the upper portion of each line of the V, as illustrated in solid line in FIG. 11 of the drawings.

A plurality of blocks 40 are spaced along the jacket 38 of the cable 36, and reference to FIGS. 3, 4 and 5 of the drawings will show that cable V-belt 34 may connect two pulleys such as pulleys 60 and 62 in the same manner as a conventional V-belt 20 could connect such pulleys. However, the difference between the cable V-belt 34 and the conventional belt 20 is readily apparent. The cable V-belt 34 provides the necessay V-shaped sides 42 and 44 to fit the inner portions 28 and 30 of the pulleys. However, because the blocks 40 are free from one another, except for their connection by the cable 38, there is much greater flexibility in the completed transmission belt 34 than there is in the cable 20 of the old art. This flexibility is achieved without sacrificing strength, mobility and utility.

FIG. 5 shows also, at reference numeral 70, a splice to make the belt 34 a continuous belt. The splice is illustrated in enlarged detail in FIG. 6. It is made by taking two ends of cable 36 and splicing them together with a bushing 72 which can be crimped over the ends to make the splice. A block 40 can be placed or molded over the splice for finishing purposes.

In FIG. 7 of the drawings, cable 34 is placed around a relatively small V-pulley, and it will be noted that ends 46 and 48 adapt the belt 34 to flex around extremely small radii. The belt will also flex from right to left.

FIGS. 8 and 9 illustrate the invention with cable blocks of varying shapes. By rounding the ends of the blocks 40 as at reference numerals 80 and 82 as in FIG. 8, the belt 34 will be adapted to flex better to the right and left (as illustrated by the solid and dotted lines). The same effect is created by the bevelled corners 90 and 92 as shown in FIG. 9.

In FIGS. 10 through 19 of the drawings another form of belt of the invention 96 is shown, comprising V-blocks 98. The V-blocks 98 have sides 100 and 102 with surfaces 104 and 106. In FIG. 11 of the drawings imaginary lines 108 have been extended from surfaces 104 and 106 to a point at reference numeral 110 to indicate the preferred angle of convergence of surfaces 104, 106, which in this case is 33°. While 33 degrees is preferred in most applications, this of course can be varied within the limits of operation of the belt and is not critical except that it adapts the belt to most standard operations.

FIG. 11 shows the general outline of V-block 98, showing that from an end view which indicates the cross section the block has a wing-like appearance and that opposing sides 100 and 102 have the configuration of a pair of wings when viewed from the end or taken in cross section. This configuration in the block 98 is provided by forming a pair of shoulders 112 and 114 and base portions 116 and 118. The upper outline is curved downwardly between the shoulders 112 and 114 and upwardly around the cable 120 to form an upper curved recess 122. A lower curved recess 124 is formed by curving the body portion of the V block 98 inwardly from base portions 116 and 118 and around cable 120. The wing-like formation provides a pair of reduced sections 126 and 128 between sides 100 and 102 and the cable 120. The cable 120 is located longitudinally through the block 98 and medially of the wing-like formation.

The V-blocks 98 are made of a plastic material such as polyurethane having sufficeint body to perform as a transmission belt component and yet having sufficient resiliency to permit the sides 100 and 102 movement with relation to the balance of the body portion of blcok 98. The preferred range of movement is shown in FIGS. 11, 12 and 13 of the drawings.

FIG. 11 shows the V-block 98 in normal position without the sides 100 and 102 moving or flexing. FIG. 12 shows block 98 with the base portions 116 and 118 moved together and the shoulder portions 112 and 114 moved outwardly. FIG. 13 shows base portions 116 and 118 moved outwardly and shoulder portions 112 and 114 moved inwardly. This illustrates the flexibility of the V-block 98 in that its sides 100 and 102 are movable either together or independently with relation to the rest of the body portion of the block.

The block 98 construction is also adapted to twist in all directions with the cable 120. Cable 120 is covered with a jacket 121 which has the same flexibility and resiliency of th plastic material of the blocks 98. The cable jacket 121 is continuous. In this form of the invention, as in other forms, the blocks 98 and the cable jacket may be molded as one piece from the same plastic material.

Thus a transmission 96 is provided which can twist in all directions. The V blocks 98 are adapted to fit standard pulleys 32, and the belt 96 and its blocks 98 can be deformed to permit drive between offset aligned pulleys 32a and 32b, as shown in FIG 14, and many other types of angle and 3-D drives.

In FIGS. 15, 16 and 17 a splice 132 for cable 96 is illustrated. The ends 134 and 136 of cable 120 are brought together and a bushing 138 (like bushing 72) is crimp pressed around the ends by a pressure which will reduce the figure 8 shape of the bushing 138 are shown in FIG. 16 to an almost circular shape holding cable ends 134 and 136 in a gripping clamp as in FIG. 17.

Referring now to FIG. 15, the two cable ends 134 and 136 are placed together. The right hand block 98a is somewhat out of alignment while the splice is being made, but after bushing 138 is completely crimped, by a pair of pliers or any other means, as shown in FIG. 17, block 98a will come back into alignment as shown by dotted lines 98b. The splice may be finished off by molding a V-block 98c over the bushing 138 indicated by dotted lines in FIG. 15.

It will be noted that it is preferred to provide lateral connecting struts 140 (see FIGS. 10 and 11) between successively positioned V-blocks 98. These struts are preferably placed at the sides of belt 96 relative to surfaces 104 and 106 and spaced from the cable covering portion by means of openings 142 which are between each block 98 and the cable jacket 121 and the lateral struts 140.

Another construction for splicing a cable 96 into an endless loop is shown in FIGS. 16 and 19 of the drawings. At least one lace 144, preferably a pair of laces 144, are laced through the openings 142 as shown in FIG. 19 to hold blocks 98 at the belt ends 146 and 148 in end facing position. The lace 144 is held in place by means of stops 150 and 152. The stops 150 and 152 are provided with means such as surfaces 154 or barbs 156 to prevent a lace end from passing through an opening 142. It will be understood that stop 152 is in the shape of a hook with barbs 156 to permit it to pass in a first direction through an opening 142 and prevent its return through the opening 142. This type of construction permits a field splice by lacing the ends 146 and 148 of the belt 96 together.

The following advantages are obtained with the construction of the V-belt of the invention:

1. Great cable strength from the continuous molded and spliced jacketed cable;

2. can be molded in infinite continuous lengths — results in minimum storage or stocking problems — lengths to suit any design rather than design to standard lengths;

3. more flexibility;

4. use on smaller pulleys;

5. larger transmission ratios;

6. will twist and turn and provide for right angle and three dimensional drives;

7. can be hand spliced with pliers, while belt on machinery, without moving pulleys to save time and maintenance costs;

8. Can splice new sections to replace worn sections without discarding entire cables (makes for better on-the-spot repairs when new equipment is not available for replacement) and block molds can be made over splice at the factory;

9. lighter weight;

10. operates with all conventional V-belt pulleys;

11. smoother operation—(no rough canvas overlay or lap points;)

12. sidewalls pivot about cable pivot point and lock in pulley groove — offers more positive less slip drive;

13. readily adaptable for code colors to suit size of equipment and for other purposes, including the use of the color "red" for safety where required;

14. company names or other instructions can be molded directly on the belt.

What is claimed is:

1. A transmission belt comprising a flexible elongated body portion comprising at least one elongated body element on which a series of blocks are positioned, in which the elongated flexible body element comprises a central cable element convered by a plastic jacket, and in which the blocks are each comprised of a body portion comprising opposing sides, each side comprising a surface portion normally in a plane, in which said planes form, in cross section, an outline corresponding to at least a portion of the lines of a V.

2. The transmission belt as claimed in claim 1, in which a plurality of blocks each comprise a body portion having a pair of opposing sides having surfaces in converging relationship.

3. The transmission belt as claimed in claim 2, in which each of the pair of opposing sides having surfaces in converging relationship are movable with relation to the balance of the body portion of said block.

4. The transmission belt as claimed in claim 3, in which the pair of opposing sides having surfaces in converging relationship have the configuration of a pair of wings in cross section.

5. The transmission belt as claimed in claim 4, in which the cable is located longitudinally through the V-block medially of the wing-like formation.

6. The transmission belt as claimed in claim 5, in which a plurality of V-blocks and a continuous cable jacket of plastic are molded around the cable.

7. The transmission belt as claimed in claim 6, in which the molded cable jacket and the material of the V-blocks is integral.

8. The transmission belt as claimed in claim 7, in which there is at least one lateral connecting strut between successively positioned V-blocks along the cable.

9. The transmission belt as claimed in claim 8, in which the lateral connecting strut is positioned in spaced relationship from the central cable along a side of the belt formed by at least one pair of successive V-Blocks.

10. The transmission belt as claimed in claim 9, in which there are at least one pair of lateral connecting struts formed on each side of the cable.

11. The transmission belt as claimed in claim 10, in which there are at least a plurality of lateral connecting struts formed in each side of the cable.

12. The transmission belt as claimed in claim 11 formed in an endless loop.

13. The transmission belt as claimed in claim 12, formed in an endless loop by means of a splice including ends of the cable clamped together within a crimped bushing.

14. The transmission belt as claimed in claim 13, further comprising a V-block molded over the spliced portion of the cable.

15. The transmission belt as claimed in claim 14 having a first end and a second end, said first and second end being placed in end facing relationship and spliced together by means comprising at least one lace lacing through a plurality of openings formed between said lateral connecting struts and said central cable.

16. The transmission belt as claimed in claim 15, in which there are a pair of laces on each side of the cable comprising lace stops positioned adjacent one of said openings to prevent the lace from unlacing.

17. The transmission belt as claimed in claim 16, in which at least one lace stop is in the form of a hook adapted to pass through one of said openings in a first direction only, said hook having barb-like means to prevent passage of the hook in a return direction through said opening.

18. The transmission belt as claimed in claim 11, in which the lateral connecting struts comprise outer side surfaces having at least a portion thereof normally in the same plane as the respective outer sides of the adjoining blocks.

19. A cable V-transmission belt comprising a flexible elongated body portion comprising at least one elongaged body element on which a series of V-blocks are positioned, in which the elongated flexible body element comprises a central cable element covered by a plastic jacket, and in which the cable clocks are comprised of a body portion having V-shaped sides.

20. The cable V-transmission belt as defined in claim 19, in which there are a plurality of blocks arranged along the elongated flexible body element, each block having substantially V-shaped ends in addition to the substantially V-shaped sides.

21. The cable V-transmission belt as defined in claim 19, in which the belt is made as an endless belt by splicing the ends of the central cable element of a length of cable end to end with a splice including a bushing.

22. The cable V-transmission belt as defined in claim 19, including at least one splice comprising portions of the central cable element and at least one bushing.

23. The cable V-transmission belt as defined in claim 19, in which the V-blocks have shaped ends to permit lateral flexing.

24. The cable V-transmission belt as defined in claim 19, in which the V-blocks are provided with at least one color code.

* * * * *